(12) United States Patent
Harrington et al.

(10) Patent No.: US 8,040,819 B2
(45) Date of Patent: Oct. 18, 2011

(54) DISCOVERY AND IDENTIFICATION OF UPSTREAM DEVICE CHARACTERISTICS FOR SELF-CONFIGURATION OF CUSTOMER PREMISES EQUIPMENT

(75) Inventors: Kendra S. Harrington, Irvine, CA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 999 days.

(21) Appl. No.: 11/216,322

(22) Filed: Aug. 30, 2005

(65) Prior Publication Data

US 2007/0058567 A1 Mar. 15, 2007

(51) Int. Cl.
*H04L 12/28* (2006.01)
(52) U.S. Cl. .................................. 370/254
(58) Field of Classification Search .............. 370/241, 370/252, 401, 402, 254
See application file for complete search history.

(56) References Cited

U.S. PATENT DOCUMENTS

| | | | | |
|---|---|---|---|---|
| 6,584,074 B1* | 6/2003 | Vasamsetti et al. | ........... | 370/254 |
| 6,778,505 B1* | 8/2004 | Bullman et al. | ........... | 370/254 |
| 7,020,720 B1* | 3/2006 | Donahue et al. | ........... | 709/245 |
| 7,111,054 B2* | 9/2006 | Lo | ........... | 709/220 |
| 2002/0004935 A1* | 1/2002 | Huotari et al. | ........... | 717/11 |
| 2003/0078999 A1* | 4/2003 | Lund et al. | ........... | 709/220 |
| 2005/0265257 A1* | 12/2005 | Masuda | ........... | 370/254 |
| 2006/0129677 A1* | 6/2006 | Tamura | ........... | 709/227 |
| 2006/0280189 A1* | 12/2006 | McRae et al. | ........... | 370/401 |
| 2007/0025372 A1* | 2/2007 | Brenes et al. | ........... | 370/401 |

OTHER PUBLICATIONS

TR-068 by DSLHome Technical Working Group by Bathrick and Pitsoulakis dated Mar. 2005.*

* cited by examiner

*Primary Examiner* — Derrick Ferris
*Assistant Examiner* — Mohammad Anwar
(74) *Attorney, Agent, or Firm* — Haynes & Boone, LLP.

(57) ABSTRACT

In accordance with an embodiment of the present invention, a customer premises equipment (CPE) apparatus includes a first communications unit and a processing unit. The first communications unit is adapted to send and receive messages over an upstream network. The processing unit is adapted to control the sending and receiving of messages through the first communications unit. The processing unit is adapted to perform each of a plurality of first sequence tests until the first sequence tests are exhausted, and each of a plurality of second sequence tests until one of a second sequence test passes or the second sequence tests are exhausted. The processing unit is adapted to receive test results from the performed test and to configure the CPE based upon the performed test results.

12 Claims, 6 Drawing Sheets

COMPLIANCE DISCOVERY TEST FLOW

COMPLIANCE CONFIGURATION TABLE

| TEST M1 RESULT | TEST M2 RESULT | TESTS M3-M7 RESULTS | OPTIMAL NETWORK CONFIGURATION |
|---|---|---|---|
| PASS | PASS | AT LEAST ONE TEST PASSES | NETWORK-CONFIGURATION-4 |
| PASS | FAIL | AT LEAST ONE TEST PASSES | NETWORK-CONFIGURATION-3 |
| FAIL | PASS | AT LEAST ONE TEST PASSES | NETWORK-CONFIGURATION-5 |
| FAIL | FAIL | AT LEAST ONE TEST PASSES | NETWORK-CONFIGURATION-6 |
| FAIL | FAIL | NONE PASS | NETWORK-CONFIGURATION-1 (FOR CABLE MODEM) OR, NETWORK-CONFIGURATION-2 (FOR DSL MODEM) |

FIG. 6

DISCOVERY AND IDENTIFICATION OF UPSTREAM DEVICE CHARACTERISTICS FOR SELF-CONFIGURATION OF CUSTOMER PREMISES EQUIPMENT

TECHNICAL FIELD

This invention relates generally to electronic communication over a network, and more particularly to self-configuration of customer premises equipment (CPE).

BACKGROUND

Two prominent technologies for telecommunications service providers are cable and digital subscriber line (DSL). Cable technology delivers broadband services typically through a coaxial medium called a cable network connected to a cable modem in the subscriber's home or office. DSL technology delivers broadband services typically through a twisted-pair telephone line medium connected to a DSL modem in the subscriber's home or office. DSL modems are available in various types classified based on the available upstream and downstream bandwidths. These classifications include symmetric DSL (SDSL) where the upstream and downstream bandwidths are equal, asymmetric DSL (ADSL) where the upstream and downstream bandwidths are not equal, high-bit-rate DSL (HDSL), very high bit rate DSL (VDSL), and others.

Historically, cable modems were shipped in "bridge mode" on a Dynamic Host Configuration Protocol (DHCP) network, and routers were shipped by default in "routed mode", with network address translation (NAT) enabled, local area network (LAN) DHCP server enabled, and wide area network (WAN) DHCP client enabled. Typically, "bridge mode" indicates that devices on the LAN acquire (or are assigned) a public IP address from a DHCP server in the WAN, while "routed mode" indicates that devices on the LAN acquire (or are assigned) a private IP address from a local DHCP server on the LAN (the router would obtain a public IP address from a DHCP server in the WAN. This address would be shared by the LAN devices with Network Address Translation (NAT) between public and private IP domains performed by the router). This typically required no additional configuration for either LAN devices or the router from the end user in order to establish an Internet connection. Cable modem configuration defaults have been stable in the marketplace.

In contrast to the cable market, the DSL market has changed significantly over time. Historically, DSL modems were also shipped in "bridge mode". However, the DSL network protocol was typically Point-to-Point Protocol over Ethernet (PPPoE) for IP address acquisition/assignment. Use of PPPoE required additional, manual configuration (typically username and password) of a LAN device or router from the end user. Since DSL modems were typically delivered with generic defaults (and in bridging mode), the user was typically required to change the default configuration of the LAN device or the router from a WAN DHCP client to a WAN PPPoE client, and to enter the PPPoE username and password so the LAN device or router could login to the network (i.e., be authenticated and subsequently acquire a public IP address). Since the username and password are unique to the individual DSL subscriber, it was not practical to ship devices, especially routers, in PPPoE mode by default. Furthermore, this manual configuration by the user was error prone and costly to a service provider or equipment supplier since many end users failed to properly configure the devices, requiring a technical support system to respond to configuration problems, thereby increasing the cost of supporting these subscribers.

While cable modems are standardized and certified so that configuration defaults may be assumed, there was previously no industry-wide certification process for a DSL modem, and no automated way to determine if a modem was compliant with a particular standard. Although standards exist, and it is reasonable to assume that future DSL modems manufactured for use with DSL service providers will likely be compliant with most if not all of the requirements from a relevant standard, compliance to these standards are not guaranteed. Accordingly, there is a need in the art for a discovery and identification system and apparatus for self-configuration of a CPE device.

BRIEF DESCRIPTION OF THE DRAWINGS

Embodiments of the present invention and their advantages are best understood by referring to the detailed description that follows. It should be appreciated that like reference numerals are used to identify like elements illustrated in the figures.

DETAILED DESCRIPTION

Systems and methods are disclosed so that a Customer Premises Equipment (CPE) router can discover and identify the capabilities of an upstream device and self-configure based on the identified capabilities in order to establish the optimal network configuration. Computer networks are generally hierarchical in nature. Typically, a local area network (LAN) can be a cluster of two or more network nodes connected to a router node at a lower level of the hierarchy, while a wide area network (WAN) can reference a higher level of the hierarchy above the router node.

The optimal configuration of the router will depend on the capabilities of the upstream devices in the network. In order to configure a router in a network for optimal performance and/or behavior, it is necessary to determine the characteristics of the upstream devices in the network. For example, a router can probe for a modem in its upstream direction and by deliberately looking for characteristics specified in a particular standard, can infer that the modem is compliant or not compliant with the standard based on the results of the probe. With this information, the router can determine enough information to automatically configure itself appropriately.

Figure 1:
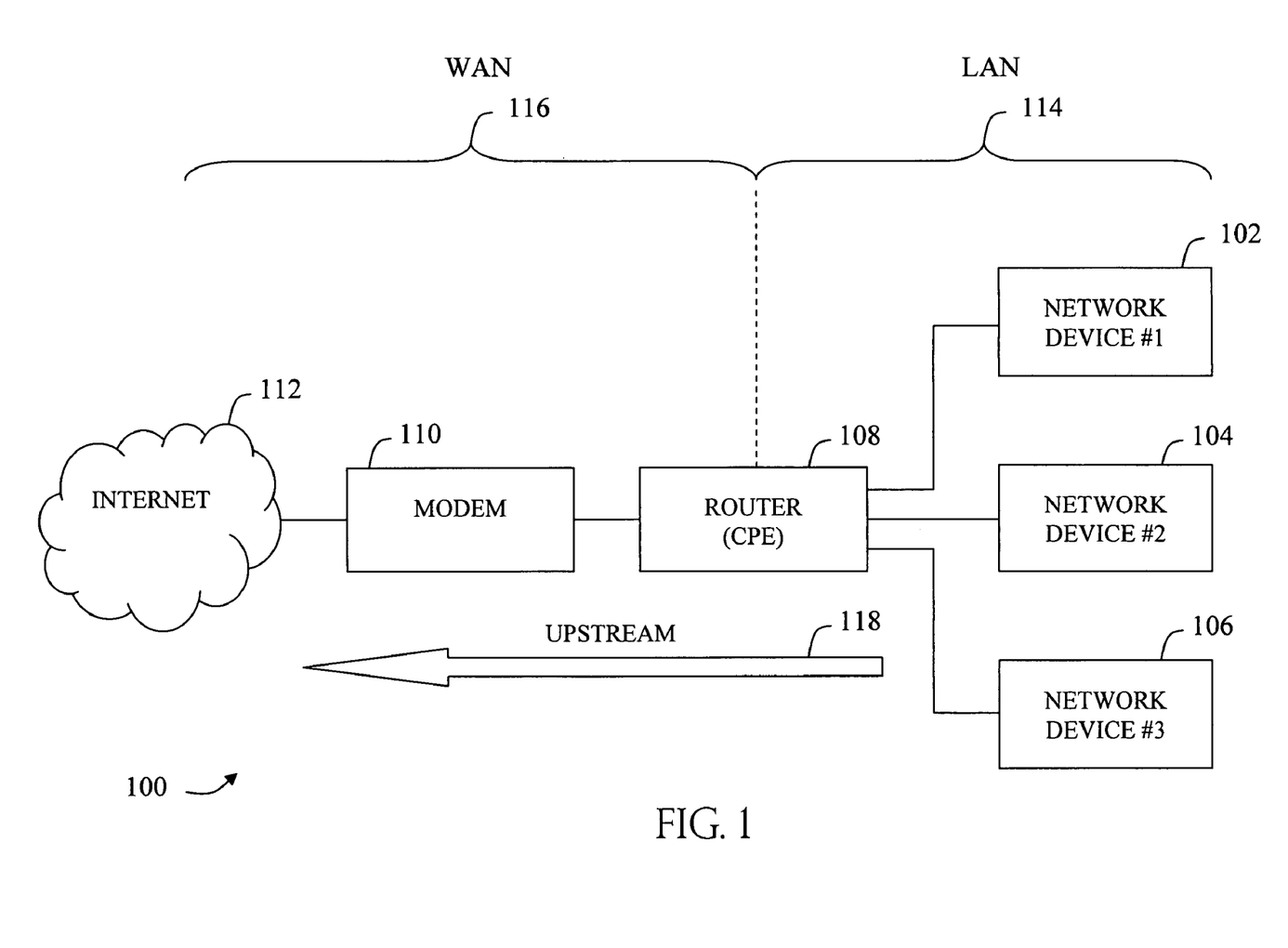
FIG. 1 shows a portion of a hierarchical network, in accordance with an embodiment of the invention.

In reference to FIG. 1, a portion of a hierarchical network 100 is shown including a first network device 102, a second network device 104, and a third network device 106 that are connected to a Customer Premises Equipment (CPE) router 108 at a first level of hierarchy. The term CPE can sometimes refer to any equipment located on a customer's premises, including a router, modem, or even a terminal device. However, in this disclosure, the term CPE may be used interchangeably with router. Router 108 is connected to a modem 110 at a second level of the hierarchy that is considered higher than the first level. In this example, modem 110 is connected to a corresponding modem (not shown) in the realm of the Internet 112 corresponding to a third level of hierarchy that is considered highest hierarchical level in this example. Network devices (102-106) are the terminal nodes in this network and can be personal computers (PCs), servers, printers, and media devices, for example. Router 108 is typically placed as a connection point between two networks in order to connect a LAN 114 at a lower level of the network 100 hierarchy to a WAN 116 at a higher level of the hierarchy.

In view of this hierarchy, data flow in network 100 from LAN 114 to WAN 116 is said to flow in an upstream direction 118, while data flow in network 100 from WAN 116 to LAN 114 is a downstream direction that is opposite to upstream direction 118. From the perspective of router 108, all other network devices on a network can be separated into two groups, upstream devices are closer to the Internet 112, while downstream devices are farther away from the Internet 112. Although modem 110 is shown as upstream from router 108, the discussion herein may also apply to an upstream router (not shown), or a gateway modem that incorporates the functions of both a traditional broadband modem and a router. Therefore, modem 110 may be referred to more generally as an upstream network node 110 or device.

Each node operating on the network has an Internet Protocol (IP) address that is unique for the particular scope of the device within the network. That is, each node at the same level of hierarchy must have a unique network address in order to accurately transfer data packets between the various nodes. When crossing a level of hierarchy, a network address translator (NAT) may be employed to translate between WAN network (public IP) addresses and LAN network (private IP) addresses, for example.

More recently, DSL modems are being shipped in a routed mode, and there are two additional features that have been implemented. The first feature is termed IP Passthrough, also called IP Sharing. The second feature is termed PPPoE Passthrough. Both of these features are required in a standards document entitled "Base Requirements for an ADSL Modem with Routing", TR-068, published by the DSLHome-Technical Working Group in May 2004. These features are more fully explained in reference to FIGS. 2-3.

Figure 2:
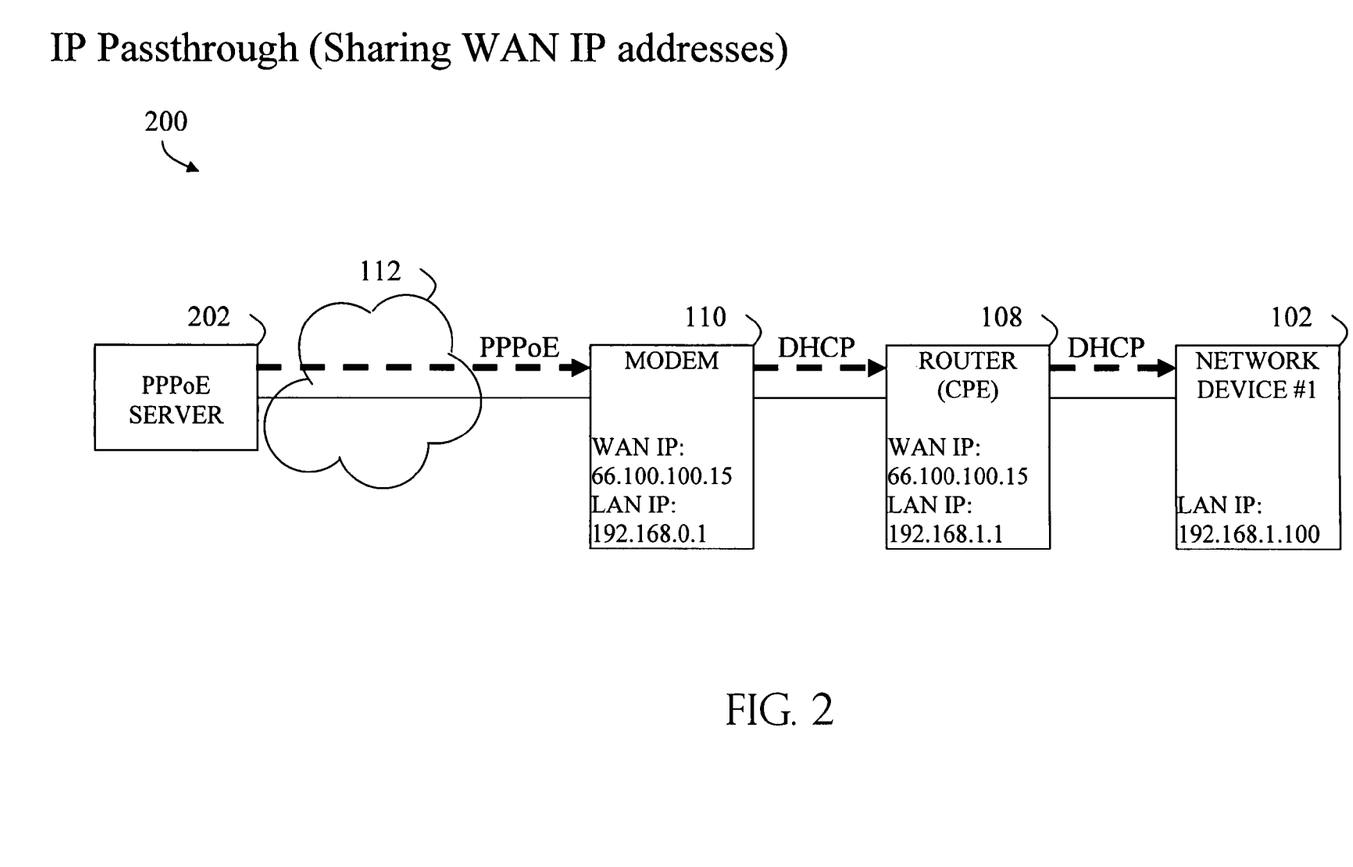
FIG. 2 shows a portion of a hierarchical network with network address assigned in an Internet Protocol (IP) Passthrough mode where a Wide Area Network (WAN) public IP address is shared, in accordance with an embodiment of the invention.

In reference to FIG. 2, a network 200 and example network addresses in an IP Passthrough mode are shown where the WAN IP addresses are shared. Network 200 includes a Point-to-Point Protocol over Ethernet (PPPoE) server 202 connected to modem 110 through Internet 112 which provides a WAN address of 66.100.100.15 to modem 110 through the PPPoE protocol. IP Passthrough allows router 108 to acquire the same IP address through its WAN DHCP client. In this example, the acquired IP address is the same as the address acquired through PPPoE on the WAN port of modem 110 that provides the same WAN IP address of 66.100.100.15 to CPE 108 through a Dynamic Host Configuration Protocol (DHCP). In this manner, a function of modem 110 is to transfer the IP address to CPE 108. Finally, CPE 108 provides a LAN IP address to first network device 102 through DHCP. FIG. 2 shows an abstraction of the connection between modem 110 and PPPoE server 202 since there will be other network components (not shown) interposed between these two nodes that are used in forming the network connection. Sharing the WAN IP address has the advantage that router 108 can remain in a default DHCP mode on a PPPoE network, and there is no need to reconfigure modem 110 to "bridge mode" in order to add a downstream router. In the present disclosure, all IP addresses shown are for example only, and are not considered to be limiting.

Figure 3:
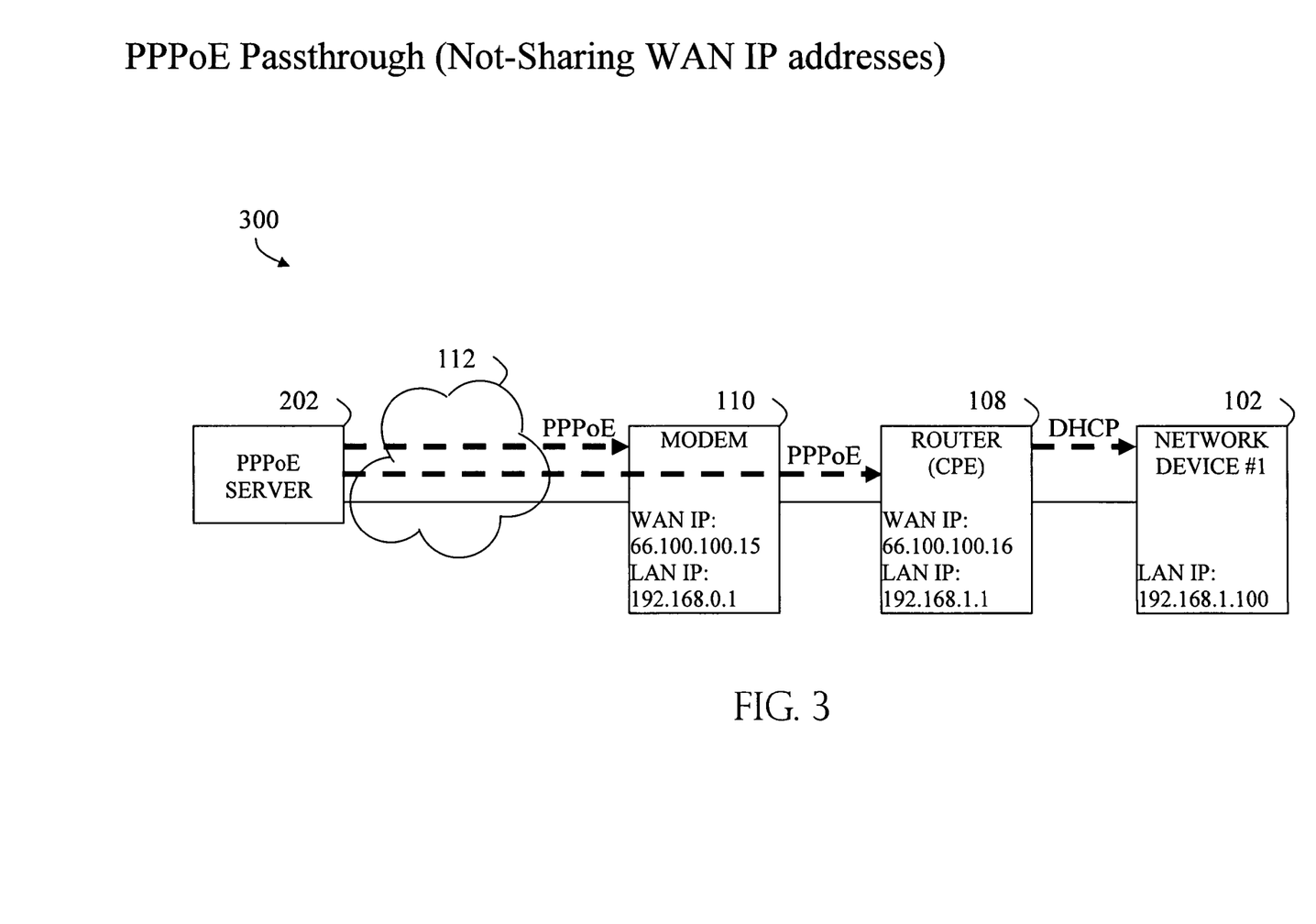
FIG. 3 shows a portion of a hierarchical network with network address assigned in a Point-to-Point Protocol over Ethernet (PPPoE) Passthrough mode where a WAN public IP address is not shared (i.e., a device on the LAN acquires a public IP address via PPPoE), in accordance with an embodiment of the invention.

In reference to FIG. 3, a network 300 and example network addresses in a PPPoE Passthrough mode are shown where WAN IP addresses are not shared. Similar to FIG. 2, Network 300 includes PPPoE server 202 connected to modem 110 through Internet 112 which provides a WAN address of 66.100.100.15 to modem 110 through the PPPoE protocol. PPPoE Passthrough allows router 108 to acquire an IP address through its WAN PPPoE client, and the PPPoE session passes through modem 110, even if modem 110 initiates its own PPPoE session. In contrast to the IP Passthrough shown in FIG. 2, PPPoE server 202 provides a WAN address of 66.100.100.16 directly to CPE 108 through the PPPoE protocol. PPPoE Passthrough has the advantage of flexibility where a router that is connected by "passing through" the modem could then be connected to a different service provider than the provider the upstream modem is connected to. In this case, the broadband service is shared even though the public IP address is not being shared. Conversely, there are no advantages if the upstream modem also supports IP Passthrough since the router still requires a PPPoE setup, which can be difficult from a usability standpoint.

These additional features shown in FIGS. 2-3 multiply the possible configuration options for broadband modems, and as such increase the possible configuration choices for the router defaults. For a modem that includes router capabilities, four configuration options, labeled as Router-Configuration-A through D, are possible for a downstream router:

Router-Configuration-A (RA)—A first configuration includes setting the router for PPPoE mode, that is to enable an embedded PPPoE client on the router's WAN port. This configuration could be used when the router is downstream from a bridged modem on a PPPoE DSL network. This configuration could also be used when the router is downstream from a routed modem on a PPPoE DSL that supports PPPoE Passthrough (see FIG. 3). However, this configuration requires a manually entered PPPoE username and password, which is not advantageous from a usability standpoint. In addition to which, the PPPoE passthrough mode supported by a routed modem is generally used to allow LAN clients to connect to multiple service, not to support a secondary PPPoE client to the same service provider.

Router-Configuration-B (RB)—A second configuration includes leaving the router in a default DHCP mode. This configuration could be used when the router is downstream from a bridged modem on a DHCP network. This configuration could also be used when the router is downstream from a routed modem that supports IP Passthrough (see FIG. 2). However, this configuration can create a double router/double NAT network which then can cause problems for applications on the LAN if the router is downstream from a routed modem that does not support IP Passthrough.

Router-Configuration-C (RC)—A third configuration includes reconfiguring the modem into bridge mode and leaving the downstream router in a default configuration. While this configuration could be used when a router is downstream from a routed modem, it is not a recommended configuration due to the difficulties in reconfiguring the modem.

Router-Configuration-D (RD)—Finally, a fourth configuration includes reconfiguring the router as a bridge which would disable both the DHCP server and network address translation (NAT). This configuration eliminates the possibility of a double router/double NAT network regardless of the specific features supported by a routed modem.

Even if an upstream device lacks certain desired capabilities, optimal configuration depends on knowing the actual capabilities of the upstream device and setting the configuration appropriately. Currently, there are six main network configuration combinations for router 108 and modem 110 in use today:

Network-Configuration-1 (N1)—Modem 110 is a cable modem in bridge mode on a cable network. In this case, the optimal configuration for router 108 is to remain in the default routed mode. This configuration assumes a WAN DHCP server is available. Router 108 is in routed mode, network address translation (NAT) is enabled, LAN DHCP server is enabled, and the WAN DHCP client is enabled. In this network configuration, option RB is most optimal.

Network-Configuration-2 (N2)—Modem 110 is a DSL modem in bridge mode on a telephone or DSL network. In this case, the most likely optimal configuration for router 108 is to enable WAN PPPoE client and leave other settings as default. Router 108 is in routed mode, NAT is enabled, and LAN DHCP server is enabled. In this network configuration, option RA is most optimal.

Network-Configuration-3 (N3)—Modem 110 includes router features and supports IP Passthrough, and does not support PPPoE Passthrough. In this case, the optimal configuration for router 108 is to remain in the default routed mode with network address translation (NAT) enabled, LAN DHCP server enabled, and the WAN DHCP client enabled. In this network configuration, option RB is most optimal.

Network-Configuration-4 (N4)—Modem 110 includes router features and supports IP Passthrough, and does support PPPoE Passthrough. In this case, the optimal configuration for router 108 is to remain in the default routed mode with network address translation (NAT) enabled, LAN DHCP server enabled, and the WAN DHCP client enabled. In this network configuration, option RB is most optimal.

Network-Configuration-5 (N5)—Modem 110 includes router features and does not support IP Passthrough but does support PPPoE Passthrough. In this case, configuration option RD is optimal while configuration option RA is the next most optimal.

Network-Configuration-6 (N6)—Modem 110 includes router features and does not support either IP Passthrough or PPPoE Passthrough. In this case, the optimal configuration includes reconfiguring the router into bridge mode that would disable both the DHCP server and network address translation (NAT). A second configuration includes leaving router 108 in DHCP mode. With a modem that includes router features but does not support the NAT-bypass features (IP Passthrough and PPPoE Passthrough), configuration option RD is optimal while configuration option RB is next most optimal.

Figure 4:
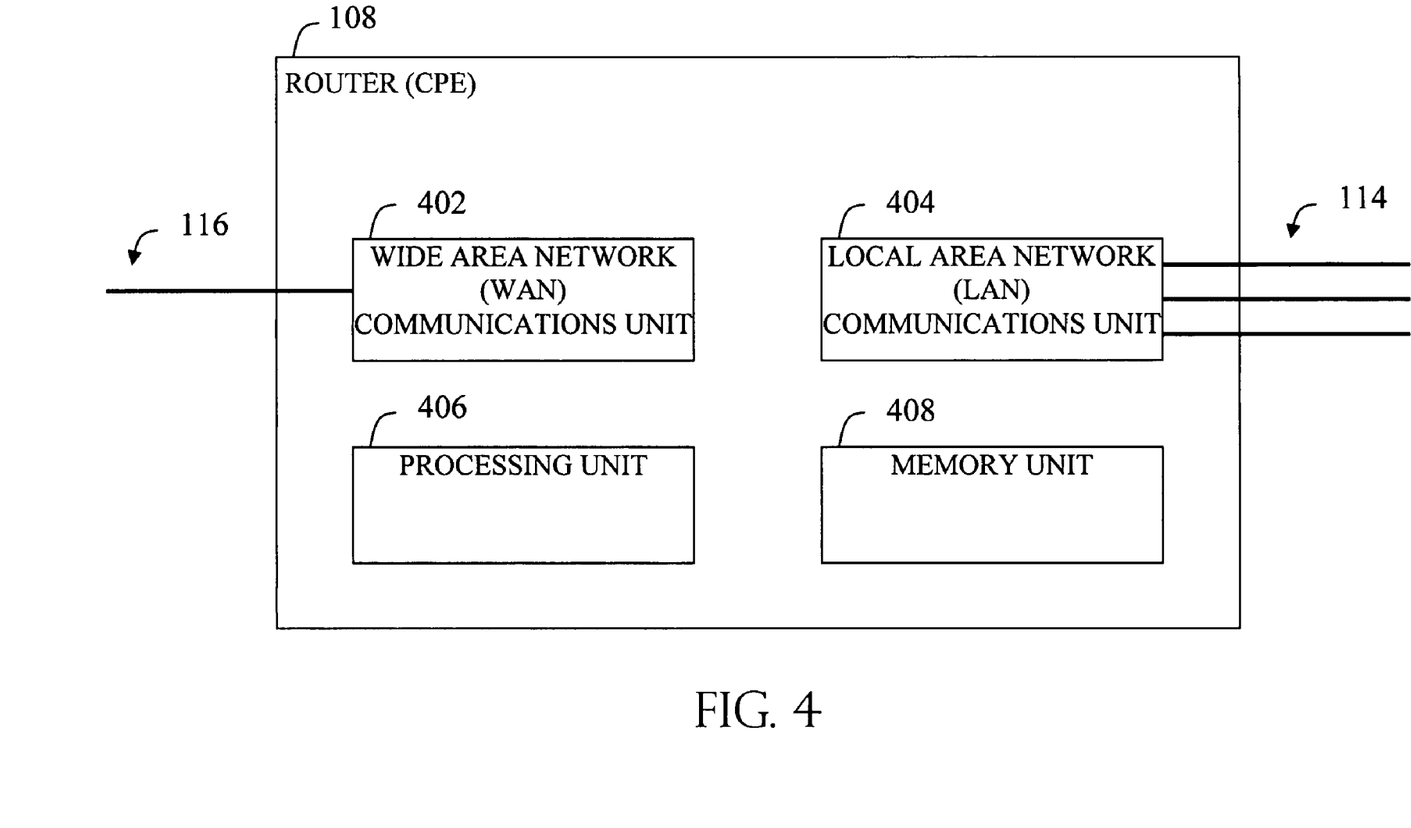
FIG. 4 shows a simplified block diagram of a router, customer premises equipment (CPE), in accordance with an embodiment of the invention.

FIG. 4 shows a simplified block diagram of a router, customer premises equipment (CPE) 108 including a wide area network (WAN) communications unit 402 for communications over WAN 116, a local area network (LAN) communications unit 404 for communications over LAN 114, a processing unit 406 for moving and manipulating data within CPE 108 and for controlling the sending and receiving of messages through WAN communications unit 402 and LAN communications unit 404, and a memory unit 408 for storing and retrieving data. Processing unit 406 can be a suitably programmed microprocessor or microcomputer. Memory unit 408 can be any device that is enabled to store and retrieve information including program data, scratchpad space, constants, and variables. Typically, memory unit 408 can include a random access memory (RAM), read only memory (ROM), magnetic recording and reproducing device, or electrically alterable storage and retrieval device such as an electrically erasable programmable ROM (EEPROM).

A Technical Report, TR-068, produced by the DSLHome-Technical Working Group includes a number of items (I-numbers) which are required, recommended, or optional, that define the basic behavioral characteristics for an ADSL modem with embedded router functionality that can be configured for customer use by service providers (however, it should be noted that the features described in TR-068 can also be applied to routers that do not include an integrated modem). Required items must be met, recommended items should be met, and optional items may or may not be met in order to comply with TR-068.

In one embodiment, in order to determine if a broadband modem is compliant with TR-068, a minimum number of characteristics, from two different groups of characteristic tests, must be detected. These characteristics are determined by detecting the upstream modem features as measured by the response of modem 110, or another upstream device, to predetermined tests from router 108. There are a total of seven modem features in the two test groups where each tested feature is related to one or more TR-068 (item) I-numbers. The first group of tested features includes two tests to determine the presence of built-in network address translator (NAT) bypass features, including IP Passthrough and PPPoE Passthrough. The second group of tested features determines the presence of a modem capable of NAT. Both tests in the first test group are executed regardless of whether the first test passes. Even if both tests do not pass, the results provide important diagnostic information. In more detail, the two modem features tested in the first test group are:

Modem-Feature-1 (M1): (I-197) Upstream network node 110 must be able to assign its WAN IP address (e.g. public IP address) to a particular LAN device, concurrent with private IP addressing being used for other LAN CPE. In this manner, router 108 may use Simple Transversal of UDP (STUN) to determine the WAN IP of modem 110 and compare to the WAN IP address of router 108 that is acquired via the DHCP server. If this test determines the WAN IP address on the upstream modem is the same as the WAN IP address of router 108, and a subsequent test from the second group of tests determines the presence of a modem capable of Network Address Translation (NAT), then modem 110 supports IP Passthrough.

Modem-Feature-2 (M2): (I-125/137) PPPoE bridging and associated operation in the modem must not fail nor operate improperly in the presence of vendor-specific PPPoE extensions which may be in use by LAN devices. Stated differently, the modem must interoperate with well-known PPPoE client software. In this manner, router 108 can determine it is in a PPPoE network and that it can acquire a PPPoE connection. If router 108 can discover both a PPPoE server and a DHCP server simultaneously, wherein the IP address scheme of the DHCP server is private IP (e.g. 192.168.x.x or 10.x.x.x), then router 108 can conclude it is behind (downstream) a modem capable of PPPoE Passthrough. In this example, the "x" symbols are wildcards referring to any valid octet value.

After M1 and M2 are both tested, then testing may proceed to the requirements of the second characteristic group. The second group of tested features determines the presence of a router that is situated downstream from a NAT enabled modem. In more detail, the five modem features in the second characteristic group are:

Modem-Feature-3 (M3): (I-231) Determine the existence of a local Domain Name Server (DNS) where the modem must add the DNS entry "dsldevice" for its own address. This feature is detected when the router performs a domain name query (e.g. using HTTP) of the modem directed to "dsldevice". The modem will respond with its own IP address when the local DNS resolves the name query and will return that IP address to the router making the inquiry.

Modem-Feature-4 (M4): (I-189) When the modem's embedded DHCP server is enabled, the modem itself must default to the address 192.168.1.254 with a network mask of 255.255.255.0. If the modem's embedded DHCP server is disabled, the modem will have an IP address selected from a common list such as 192.168.1.254, 192.168.1.63, or 192.168.1.253. This feature is detected by router 108 using a "ping" or Address Resolution Protocol (ARP) query to determine the LAN IP address of the modem.

Modem-Feature-5 (M5): (I-244) A configuration mechanism from modem 110 to downstream network devices based on extensible markup language (XML) must be supported as defined the DSL Forum Working Text TR-064. This feature is detected by whether the modem will respond to a LAN side request or query. The router performs this test by initiating a LAN side query of the modem and receiving a response. Alternatively, the router performs this test by listening for advertisements from the modem.

Modem-Feature-6 (M6): (I-182) The modem must use the default starting address of 192.168.1.64 and the default stop address of 192.168.1.253 for assignment to DHCP leases for local network addressing. In this manner, router 108 can query modem 110 for the min/max DHCP addresses allowable in the DHCP server pool. The query can include, but is not limited to, a TR-064 request or other inquiry including "screen scraping".

Modem-Feature-7 (M7): (I-183/196) Upstream network node 110 must use a default network mask of 255.255.255.0 for assignment to DHCP leases for local device addressing, and upstream network node 110 must support multiple subnets being used on the local LAN. In this manner, router 108 can parse the DHCP response where the netmask is park of the DHCP response.

As described, testing of M1 and M2 are performed as a first group, and each of the remaining tests M 3 through M7 are performed until a second group test passes or the second group tests are exhausted. Based on the results of testing M1, M2, and at least one of M3 through M7, the downstream router may reasonably determine whether the upstream network device is compliant with the relevant portions of the TR-068 requirements.

Figure 5:
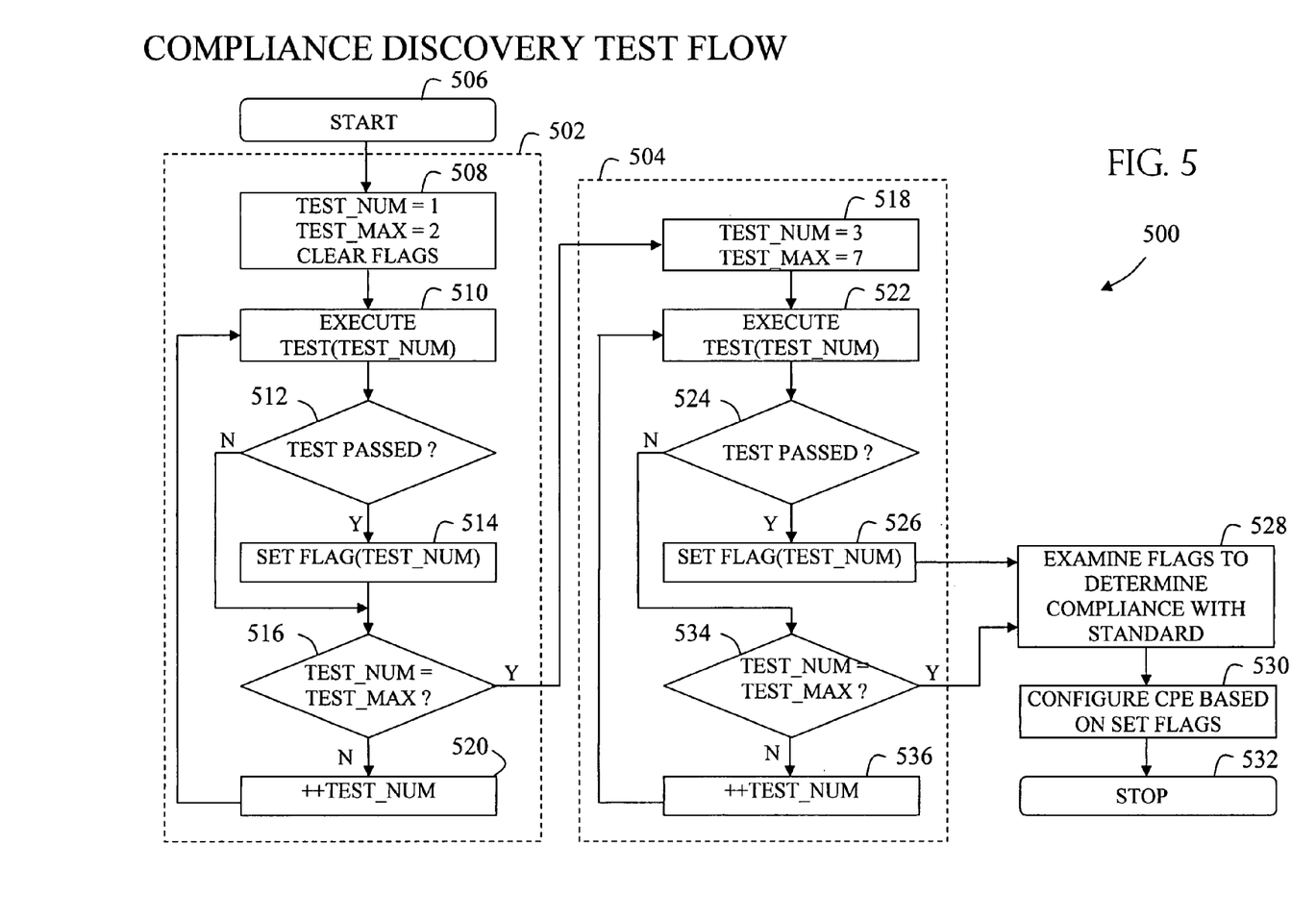
FIG. 5 shows a compliance discovery test flow including a series of operations that can discover and identify whether an upstream network node is compliant or not compliant with an expected standard, in accordance with an embodiment of the invention.

FIG. 5 shows a compliance discovery test flow 500, including a series of operations that can discover and identify whether an upstream network node (modem 110) is compliant or not compliant with an expected standard, in order to properly configure a downstream network node (CPE 108). Flow 500 a first testing sequence 502 corresponding to a first group of tests and a second testing sequence 504 corresponding to a second group of tests. Flow 500 begins with a start operation 506. Upon initial connection to a modem 110, CPE 108 will begin discovery test flow 500 at start operation 506. Flow 500 includes an initialization operation 508 where variable TEST_NUM is initialized to one, variable TEST_MAX is initialized to two, and a plurality of test results flags are cleared. Each test result flag holds the results of one test. The TEST_NUM value corresponds to the number, or index, of a particular modem configuration test from a list of possible tests. TEST_MAX is equal to the maximum number of tests that may be executed in order to interrogate the upstream node for the first test group.

After the TEST_NUM and TEST_MAX variables are initialized, control moves to operation 510 where the particular test associated with TEST_NUM is executed. Once the test associated with TEST_NUM is executed, control moves to operation 512 where it is determined whether the test associated with TEST_NUM passed. If the test associated with TEST_NUM passed, the result of the conditional test is 'Y' and control moves to operation 514 where a flag is set corresponding to the number of the test. Once the flag is set in operation 514, control moves to operation 516 where variable TEST_NUM is compared with TEST_MAX to determine if all of the tests in the first group have been attempted, or if all the tests in the first sequence of tests are exhausted. However, in operation 512, if the test associated with TEST_NUM failed, the result of the conditional test is 'N' and control moves directly to operation 516 without setting the flag corresponding to TEST_NUM. In operation 516, if TEST_NUM is equal to TEST_MAX then all of the tests in the first group of tests have been attempted and control moves to operation 518 where it is determined that the upstream node is not compliant with the expected standard. However, in operation 516, if TEST_NUM is not equal to TEST_MAX then all of the tests in the first group of tests have not been attempted, or exhausted, and control moves to operation 520 where the TEST_NUM variable is incremented in preparation for execution of the next test and control moves to operation 510. As discussed above, in operation 510 the test associated with the variable TEST_NUM is executed. Since the TEST_NUM variable was incremented in operation 520, the next test is executed in sequence. In this manner, a loop of operations is completed in order to execute each test within the first group of tests comprising a first testing operation 502. Specifically, in the present embodiment, the first test group includes M1 and M2 corresponding to TEST_NUM equal to one and two, respectively. In another embodiment, a different number of tests may be conducted during the first testing operation 502 so the number of tests is not considered limiting.

Once all of the tests in the first group of tests are executed, control flow moves from operation 516 to operation 518 where variable TEST_NUM is initialized to three and variable TEST_MAX is initialized to seven corresponding to the five tests in the second test group 504. Once the variables are re-initialized in operation 518, control moves to operation 522 where flow 500 continues by executing the test associated with the newly initialized TEST_NUM variable. One the test associated with TEST_NUM is executed, control moves to operation 524 where it is determined whether the test associated with TEST_NUM passed. If the test associated with TEST_NUM is passed, control moves to operation 526 where a flag is set corresponding to the number of the test and control moves to operation 528 where the set flags are examined to determine compliance with a standard, such as TR-068. Once the set flags are examined in operation 528, control moves to operation 530 where the router is configured based on the set flags. A configuration process can include arranging the operational mode of the router to optimally interact with the upstream modem based on the detected characteristics in flow 500. Once the configuration process of the router is completed, control moves to operation 532 where flow 500 stops.

However, in operation 524, if the test associated with TEST_NUM is not passed, control moves to operation 534 where variable TEST_NUM is compared with TEST_MAX to determine if all of the tests in second group 504 have been attempted, or if all the tests in the second sequence of tests are exhausted. If TEST_NUM is equal to TEST_MAX then all of the tests in the second group of tests have been attempted and control moves to operation 528. However, in operation 534, if TEST_NUM is not equal to TEST_MAX then all of the tests in second group 504 have not been attempted, and control moves to operation 536 where the TEST_NUM variable is incremented in preparation for execution of the next test and control moves back to operation 522.

As discussed above, in operation 522 the test associated with the newly incremented variable TEST_NUM is executed. In this manner, a loop of operations is completed in order to execute each test within second test group 504. As soon as a first test from second test group 504 passes, the set flags are examined and configuration is performed. It is not necessary to complete all of the tests in second test group 504. Specifically, in the present embodiment, second test group 504 includes M3, M4, M5, M6, and M7 corresponding to TEST_NUM three through seven. In another embodiment, a different number of tests may be conducted during the second testing operation 504 so the number of tests is not considered limiting. Further, in yet another embodiment, a different number of testing operations, in addition to testing operations 502 and 504, may be conducted so this number is also not considered limiting.

Figure 6:
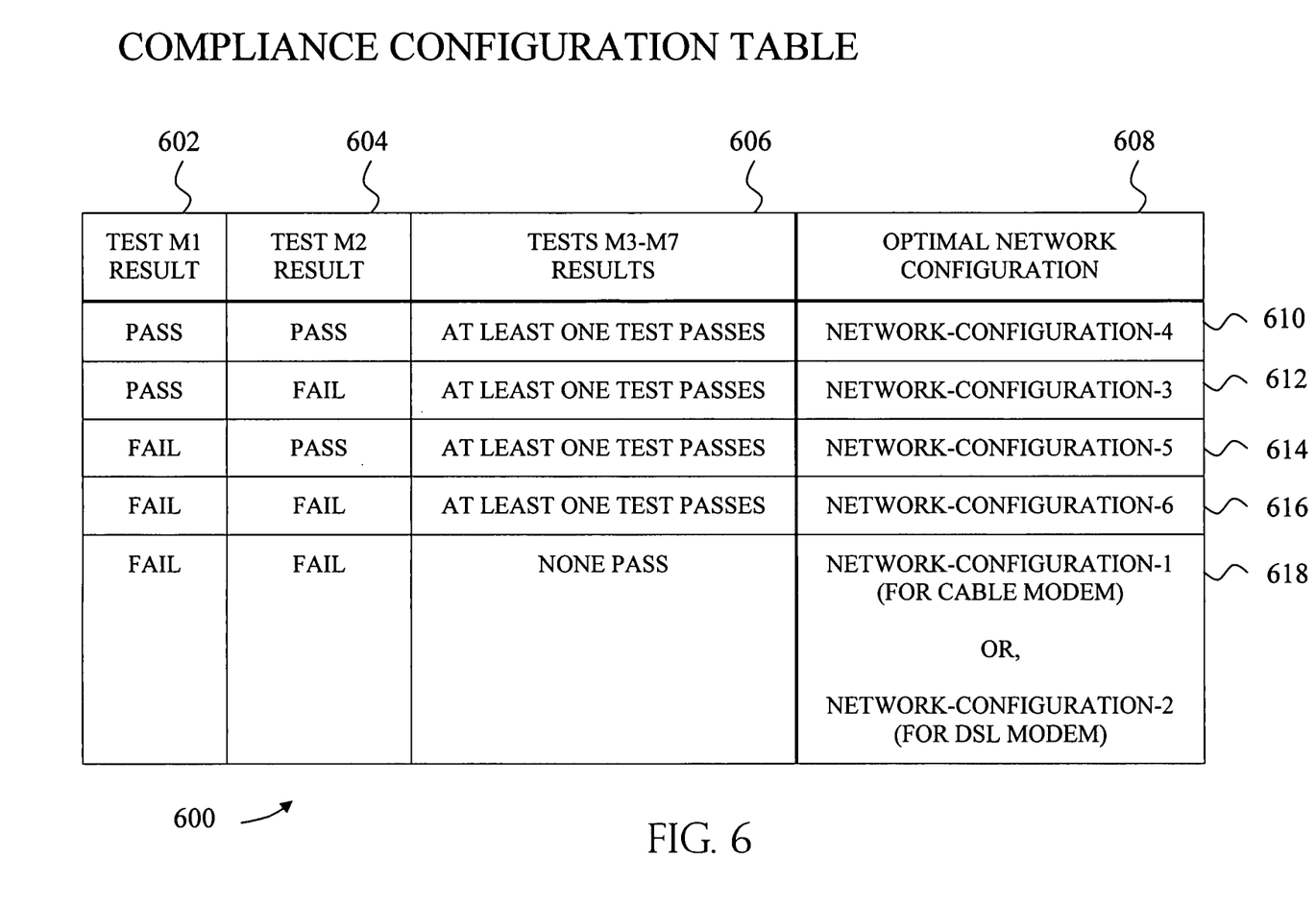
FIG. 6 shows a compliance configuration table identifying the optimal router configuration based on the results of the compliance discovery tests, in accordance with an embodiment of the invention.

FIG. 6 shows a compliance configuration table 600 that identifies the optimal router configuration based on the results of the compliance discovery tests described in reference to FIG. 5. The individual test results are divided into three categories, test M1 result 602, test M2 result 604, and tests M3-M7 result 606, that provide a framework for determining an optimal router configuration 608 based on which tests passed or failed. For example, first row result 610 shows test1 passed, test 2 passed, and at least one of tests 3-7 passed. In this case, the optimal configuration 608 is N4 since the testing results indicate the upstream modem includes router features and supports both IP Passthrough and PPPoE Passthrough. The downstream router should remain in the default routed mode with network address translation (NAT) enabled, LAN DHCP server enabled, and the WAN DHCP client enabled.

Similarly, second row result 612 shows test M1 passed, test M2 failed, and at least one of tests 3-7 passed. In this case, the optimal network configuration 608 is N3 since the testing results indicate the upstream modem includes router features and supports IP Passthrough but does not support PPPoE Passthrough. The downstream router should remain in the default routed mode with network address translation (NAT) enabled, LAN DHCP server enabled, and the WAN DHCP client enabled.

Third row result 614 shows test M1 failed, test M2 passed, and at least one of tests M3-M7 passed. In this case, the optimal configuration 608 is N5 since the upstream modem includes router features and does not support IP Passthrough but does support PPPoE Passthrough. Optimally, the downstream router should be set as a bridge, while in the second most optimal configuration the downstream router should be set in PPPoE mode.

Fourth row result 616 shows test1 failed, test 2 failed, and at least one of tests 3-7 passed. In this case, the optimal configuration 608 is N6 since the upstream modem includes router features and does not support either IP Passthrough or PPPoE Passthrough. With a modem that includes router features but does not support the NAT-bypass features (IP Passthrough and PPPoE Passthrough), the downstream router should be set into bridge mode which would disable both the DHCP server and network address translation (NAT). Optimally, the downstream router should be set as a bridge, while in the second most optimal configuration the downstream router should be left in default DHCP mode.

Finally, fifth row result 618 shows test1 failed, test 2 failed, and none of tests 3-7 passed. In this case, all the tests have failed, so the optimal configuration 608 is N1 for a cable modem, and N2 for a Digital Subscriber Line (DSL) modem. Specifically, for an upstream cable modem, the downstream router should remain in routed mode where network address translation (NAT) is enabled, LAN DHCP server is enabled, and the WAN DHCP client is enabled. For an upstream DSL modem, the downstream router should enable the WAN PPPoE client and leave the other settings as default. In this case, the downstream router is in routed mode, where both NAT and LAN DHCP server are enabled.

Although the invention has been described with respect to particular embodiments, this description is only an example of the invention's application and should not be taken as a limitation. Consequently, the scope of the invention is set forth in the following claims.

We claim:

1. A router, comprising:
a first communications unit adapted to send messages to an upstream network through a modem and to receive messages from the upstream network through the modem; and
a processing unit adapted to control the sending and receiving of messages through the first communications unit;
the processing unit being adapted to perform each of a predetermined plurality of first sequence tests including determining whether a WAN IP address of the modem is the same as a WAN IP address for the router and determining whether the router can discover both a PPPoE server and a DHCP server simultaneously, wherein an IP address scheme of the DHCP server is private IP;
the processing unit being adapted to perform each of a predetermined plurality of second sequence tests until either one of the second sequence test passes or the second sequence tests are exhausted to determine whether the modem practices NAT, wherein a first test in the second sequence comprises determining whether the modem includes a local domain name server and a second test in the second sequence comprises transmitting an address resolution protocol query to the modem to determine a LAN IP address of the modem;
the processing unit being adapted to receive test results from the performed tests to determine a network configuration from the test results, wherein the modem is a bridged DSL modem and the upstream network is a PPPoE DSL network in a first network configuration, and wherein the modem is a bridged modem and the upstream network is a DHCP network in a second network configuration, and wherein the modem does not support both IP passthrough and PPoE passthrough in a third network configuration; the processing unit being further adapted to configure the router according to the determined network configuration, wherein the router is configured into a PPPoE mode if the determined network configuration is the first network configuration, and wherein the router is configured into a DHCP mode if the determined network configuration is the second network configuration, and wherein the router is configured into a bridge mode if the determined network configuration is the third network configuration.

2. The router of claim 1, wherein the test results, based on compliance of the modem with a predetermined telecommunications standard, are sufficient for the router to automatically configure itself.

3. The router of claim 2, wherein the predetermined telecommunications standard is a technical report, TR-068, produced by a DSLHome-Technical Working Group.

4. The router of claim 3 wherein a third one of the second sequence tests examines compliance with option item I-244 of TR-068 to determine whether an upstream network node will respond to a local area network (LAN) side request.

5. The router of claim 4, wherein a fourth one of the second sequence tests examines compliance with option item I-182 of TR-068 to determine whether the modem uses a default starting address of 192.168.1.64 and a default stop address of 192.168.1.253 for assignment to DHCP leases for local network addressing leases.

6. The router of claim 5, wherein a fifth one of the second sequence tests examines compliance with option items I-183 and I-196 of TR-068 to determine whether the modem uses a default network mask of 255.255.255.0 for assignment to DHCP leases for local device addressing and whether the modem supports multiple subnets being used on a local LAN.

7. The router of claim 1, further comprising:
a second communications unit adapted to send and receive messages with the first communications unit and over a local area network (LAN) comprising a downstream network,
wherein the processing unit is adapted to control the sending and receiving of messages through the second communications unit.

8. A router, comprising:
a means for sending and receiving messages over a wide area network (WAN) comprising an upstream network through a modem;
a means for performing each of a predetermined plurality of first sequence tests until the first sequence tests including determining whether a WAN IP address of the modem is the same as a WAN IP address for the router and determining whether the router can discover both a PPPoE server and a DHCP server simultaneously, wherein an IP address scheme of the DHCP server is private IP, and for performing each of a predetermined plurality of second sequence tests until either one of the second sequence test passes or and the second sequence tests are exhausted to determine whether the modem includes NAT, wherein a first test in the second sequence comprises determining whether the modem includes a local domain name server and a second test in the second sequence comprises transmitting an address resolution protocol query to the modem to determine a LAN IP address of the modem, and for receiving test results from the performed first and second sequence tests to determine network configurations, wherein the modem is a bridged DSL modem and the upstream network is a PPPoE DSL network in a first network configuration, and wherein the modem is a bridged modem and the upstream network is a DHCP network in a second network configuration, and wherein the modem does not support both IP passthrough and PPoE passthrough in a third network configuration; and
a means for configuring the router based on the determined network configuration, wherein the router is configured into a PPPoE mode if the determined network configuration is the first network configuration, and wherein the router is configured into a DHCP mode if the determined network configuration is the second network configuration, and wherein the router is configured into a bridge mode if the determined network configuration is the third network configuration.

9. The router of claim 8, wherein the test results are sufficient to determine compliance with the requirements of technical report, TR-068, produced by a DSLHome-Technical Working Group.

10. A method of self configuration for a router, comprising:
applying each of a predetermined plurality of first sequence tests to an upstream modem including determining whether a WAN IP address of an upstream modem is the same as a WAN IP address for the router and determining whether the router can discover both a PPPoE server and a DHCP server simultaneously, wherein an IP address scheme of the DHCP server is private IP;
applying each of a predetermined plurality of second sequence tests to the modem until either one of an applied second sequence test passes or the second sequence tests are exhausted, wherein a first test in the second sequence comprises determining, whether the modem includes a local domain name server and a second test in the second sequence comprises transmitting an address resolution protocol query to the modem to determine a LAN IP address of the modem;
examining the result of each test from the applied tests to determine a network configuration, wherein the modem is a bridged DSL modem and the upstream network is a PPPoE DSL network in a first network configuration, and wherein the modem is a bridged modem and the upstream network is a DHCP network in a second network configuration, and wherein the modem does not support both IP passthrough and PPoE passthrough in a third network configuration; and configuring the router based on the determined network configuration, wherein the router is configured into a PPPoE mode if the determined network configuration is the first network configuration, and wherein the router is configured into a DHCP mode if the determined network configuration is the second network configuration, and wherein the router is configured into a bridge mode if the determined network configuration is the third network configuration.

11. The method of claim 10, wherein the router performs the first test in the second sequence of tests by sending an http query message.

12. The method of claim 11, further comprising:
receiving a test response; and
determining if the test response includes the definition of a dsldevice.

* * * * *